Figure 1:
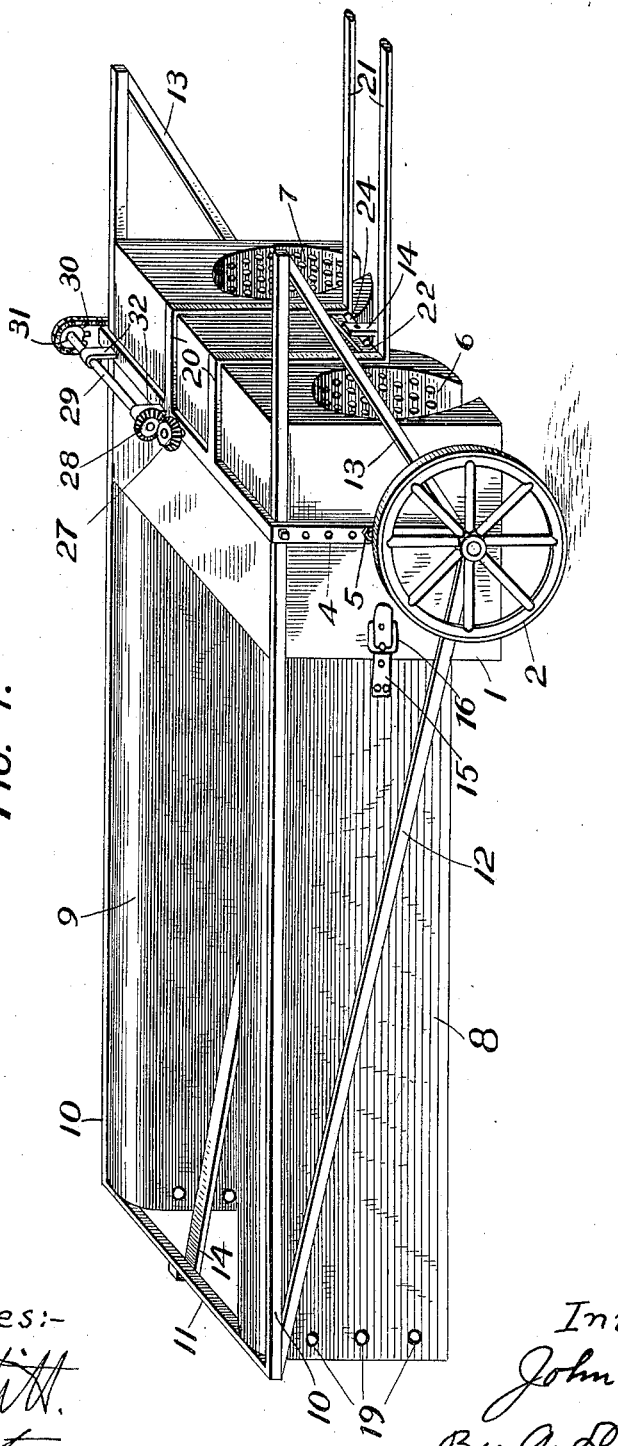

No. 744,902. PATENTED NOV. 24, 1903.
J. F. BUTZ.
INSECT DESTROYER.
APPLICATION FILED SEPT. 5, 1903.
NO MODEL. 2 SHEETS—SHEET 1.

Witnesses:—
J. W. Stitt
Geo. W. Gutzman

Inventor,
John F. Butz,
By A. D. Jackson,
Attorney.

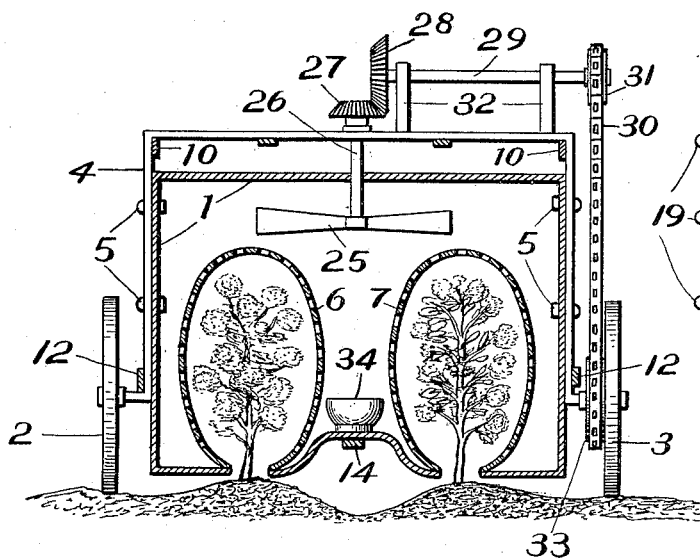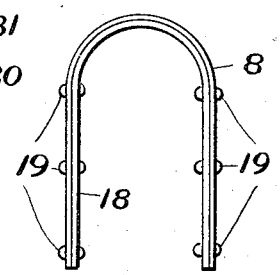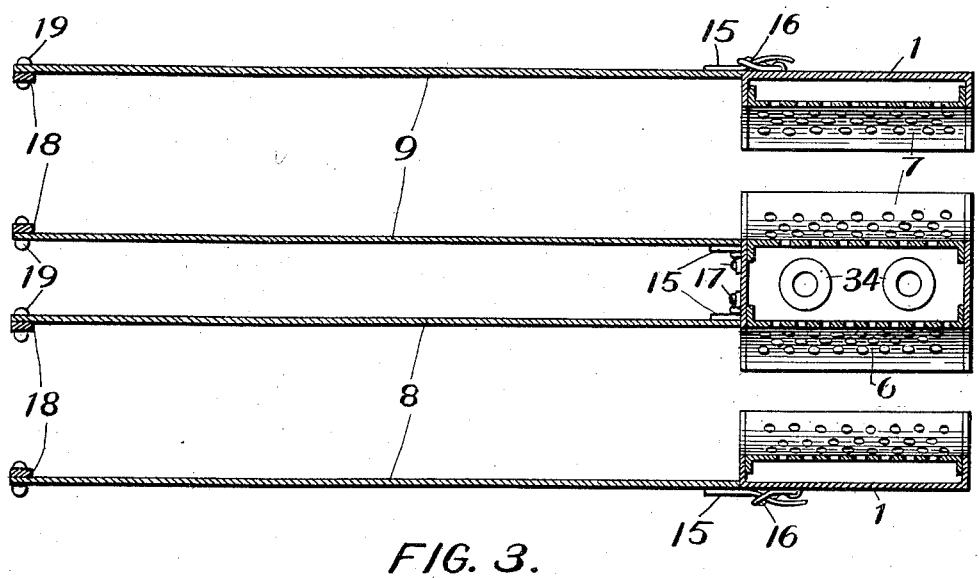

No. 744,902. Patented November 24, 1903.

UNITED STATES PATENT OFFICE.

JOHN F. BUTZ, OF FORT WORTH, TEXAS.

INSECT-DESTROYER.

SPECIFICATION forming part of Letters Patent No. 744,902, dated November 24, 1903.

Application filed September 5, 1903. Serial No. 172,116. (No model.)

*To all whom it may concern:*

Be it known that I, JOHN F. BUTZ, a citizen of the United States, residing at Fort Worth, Texas, have invented an Insect-Destroyer, of which the following is a specification.

This invention relates to a device for destroying insects on growing plants, and more particularly to a device or apparatus for destroying from growing cotton-plants the insect known as the "boll-weevil," and the object is to provide an inexpensive apparatus that will effectively destroy insects with which plants may be infested.

The objects and various advantages will be fully explained in the following description, and the invention will be more particularly pointed out in the claims.

Reference is had to the accompanying drawings, which form a part of this application and specification.

Figure 1 is a perspective view of the entire device or apparatus. Fig. 2 is a vertical cross-section in front of the wheels. Fig. 3 is a horizontal section of the fume-developing chamber and the enveloping-hoods. Fig. 4 is a rear end elevation of one of the enveloping-hoods.

Similar characters of reference are used to indicate the same parts throughout the several views.

In carrying out the objects of this invention a box or rectangular box or chamber 1 is provided, and this box is mounted, preferably, on two wheels 2 and 3. These wheels are provided with an arched axle 4, and the box is made adjustable as to height on the axle 4 by means of suitable bolts 5, so that the box may be adjusted to adapt the apparatus for plants of various heights. This box is perforated in the front and rear sides for placing perforated hoods 6 and 7 therein. The box has also longitudinal slots through the bottom part, so that the box may be passed over rows of plants. The hoods 6 and 7 are open at the bottom for the same reason or purpose. The hoods 6 and 7 close the perforations of the box, so that the only escape from the interior of the box is through the small perforations in the walls of the hoods. The hoods are perforated, as shown in Figs. 1 and 3, to allow fumes produced in the box to escape about the plants over which the hoods are passing. It is desirable that the fumes remain about the plants long enough to saturate the plants thoroughly. For retaining the fumes about the plants elongated hoods 8 and 9 are mounted in the rear of the box 1 and register with the hoods 6 and 7. The elongated or extension hoods 8 and 9 may be made as long as desirable. The extension-hoods 8 and 9 are supported at the rear ends by means of a frame. This frame consists of the horizontal bars 10 and the end bar 11, which may be integral with the bars 10, and the braces 12 and 13 and the central brace 14. The extension-hoods 8 and 9 may be made of canvas cloth or thin metal or other suitable material. These extension-hoods may be attached to the box 1 by means of straps 15 and buckles 16 and buttons 17 and may be attached to hoops 18 at the rear ends by means of buttons 19. The hoops 18 are attached to the bar 11.

The device may be drawn by one or more horses. The drawings illustrate the device adapted to be drawn by one horse or other animal. Bars 20 are attached to the axle 4 on top of the box 1 and bent down by the front of the box and then projected horizontally in front to form shafts 21. The brace 14 is bent up to some extent in front of the box 1. A cross-bar 22 is attached to brace 14 and to the bars 20 to brace the shafts. A swingletree 24 may be mounted on the brace 14.

Means are provided for forcing the fumes to be created in the box 1 to all parts of the box. A fan 25 is mounted on the shaft 26, which may be journaled in the top of box 1 and in axle 4. A bevel-pinion 27 is mounted on shaft 26. A shaft 29 is journaled in bearings 32, and a bevel-gear 28 is mounted on shaft 29 and meshes with pinion 27. A sprocket-wheel 31 is mounted on the shaft 29, and a sprocket-chain 30 is mounted on the wheel 31 and on a sprocket-wheel 33, which is mounted on the hub of wheel 3, whereby the wheel 33 drives the fan 25 by means of the intermediate gearing. Any appropriate fumes for killing insects are created in retorts 34, placed on the bottom of the box 1. The retorts may be dispensed with and the material for creating fumes placed on the bottom of the box. The fumes may be produced by burning material in the retorts or on the floor of the box 1, or the fumes may be produced by a suitable chemical process. The fumes will rise up in the box 1 and the fan 25 when driven will distribute the fumes to all parts of the box about the hoods 6 and 7, and the fumes will escape through the perforations of these hoods and envelop the plants as the hoods are passed over the plants. The fumes will be held about the plants for some time by the extension-hoods 8 and 9. The fumes to be used must be selected according to the kind of insect to be suffocated and the kind of plant to be treated.

Having fully described my invention, what I claim as new, and desire to secure by Letters Patent, is—

1. An insect-destroyer comprising a wheeled box perforated in the front and rear sides, perforated hoods extending through said box and closing the perforations thereof, and means for creating suffocating-fumes in said box for escape through the perforations in said hoods.

2. An insect-destroyer comprising a wheeled box perforated in the front and rear sides, perforated hoods extending through said box and closing the perforations thereof, and means for creating and causing suffocating-fumes to circulate about said hoods and pass from said box through the perforations of said hoods.

3. An insect-destroyer comprising a wheeled box perforated in the front and rear sides, perforated hoods extending through said box and closing the perforations thereof, said hoods having slots in the lower parts thereof whereby said hoods are adapted to pass over and about growing plants, and means for causing suffocating-fumes to pass out of said box through the perforations of said hoods as said hoods are passing over the plants.

4. An insect-destroyer comprising a wheeled box perforated in the front and rear sides, perforated hoods extending through said box and closing the perforations thereof, means for creating suffocating-fumes in said box and causing the same to escape through the perforations of said hoods, and extension-hoods attached to said box and registering with said perforated hoods.

5. An insect-destroyer comprising a wheeled truck having an arched axle, a box adjustably mounted on said axle, said box being perforated through the front and rear sides, perforated hoods extending through said box and closing said perforations, and means for causing suffocating-fumes to pass from said box through the perforations of said hoods.

6. An insect-destroyer having a wheeled truck provided with an arched axle, a box supported by said axle, perforated hoods extending through said box thereby adapting said box to pass over and about growing plants as said truck is driven, extension-hoods attached to said box and registering with said perforated hoods, and a frame braced on said axle for supporting said extension-hoods.

7. An insect-destroyer having a wheeled truck provided with an arched axle, a box supported by said axle, perforated hoods extending through said box, means for creating suffocating-fumes in said box, and means for causing said fumes to envelop said hoods and escape through the perforations thereof consisting of a rotary fan and suitable gearing operatively connecting said fan to one of the wheels of said truck.

In testimony whereof I set my hand, in the presence of two witnesses, this 29th day of August, 1903.

JOHN F. BUTZ.

Witnesses:
A. L. JACKSON,
J. W. STITT.